ized Oct. 31, 1967

3,349,501
NON-DIMPLING REGENERATED
CELLULOSE FILM
James Phillip Janosik, Richmond, Va., assignor to E. I. du Pont de Nemours and Company, Wilmington, Del., a corporation of Delaware
No Drawing. Filed Mar. 8, 1965, Ser. No. 438,082
5 Claims. (Cl. 34—41)

This invention relates to non-fibrous cellulosic films and to processes for their preparation and, more particularly, to processes for preparing non-dimpling regenerated cellulose films.

Dimpling is the term employed to refer to that defect in the appearance of coated regenerated cellulose films consisting in an overall pattern of small, fine grained distortions which is intensified with increase in relative humidity. The condition has also been referred to as pocking or wrinkling. The phenomenon is not to be confused with the defect termed puckering or cockling, which is a condition consisting in individual distorted areas which have flat even centers with radiating wrinkles. Although puckering is similarly observed when the relative humidity increases, it is a localized distortion which occurs only in those areas of the film which have a damaged or pinhole coating. Dimpling is not associated with damage coating, and indeed occurs even when the coating is perfect and intact.

Dimpling is observed to occur in films coated on either one or both sides with any of the various types of coatings used on regenerated cellulose films. The phenomenon becomes more severe as the amount of moisture in the base sheet increases, apparently because the strains associated with the dimpling become more severe. Thus, dimpling of films exposed to conditions of high relative humidity becomes more severe as the moisture content of the film increases. Furthermore, dimpling in a one-sided coated film becomes evident quite rapidly when the uncoated side of the film is placed in contact with a moisture laden article, such as a cut of meat.

The phenomenon of dimpling has been observed in virtually all tyes of regenerated cellulose film. It is, however, more pronounced in one-side coated films and the thin gauge two-side coated films. The lower stiffness of these films as compared to that of the thicker films permits a greater degree of distortion and dimpling than occurs in the case of the stiffer, thick film.

Films which are dimpled, or which are prone to dimple in use, are not acceptacle to those who package articles of commerce. Packaged articles wrapped in such film have a messy, inferior appearance connoting poor quality when compared with packages having a neat, smooth appearance. It has long been a goal of manufacturers of regenerated cellulose films to eliminate the tendency of their films to dimple. This goal, however, has been to this time an elusive one.

It is, therefore, an object of the present invention to provide non-dimpled non-fibrous cellulosic film and a process for its preparation.

It is a further object of this invention to provide a process for preparing non-dimpled regenerated cellulose films, both one-side and two-side coated, which are free from excessive width loss and which have little or no tendency to dimple under circumstances which result in an intensification of this condition. These and other objects will appear hereinafter.

These and other objects of the invention are accomplished by the process of drying a continuous web of non-fibrous gel cellulosic film in a multi-roll dryer wherein the film is dried from about 125% moisture to about 5 to 10% moisture by weight, based on the weight of dry cellulose, with heated dryer rolls having a finished surface roughness between 300 to 650 RMS microinches, said rolls having a surface roughness before finishing below about 80 RMS microinches.

Continuous webs of non-fibrous gel cellulosic film, such as regenerated cellulose film, is generally dried in a multi-roll dryer such as that described in U.S. Patent 2,746,166. It has now been discovered that the condition known as dimpling is a result of drying the film in contact with rough dryer rolls which are used to restrain transverse shrinkage of the film because of their tentering properties.

The use of rolls of varying roughness in drying cellophane is known, the rougher rolls serving to maintain the width of the cast film through their tentering action, and the smoother rolls allowing transverse shrinkage when desired. The present invention lies in the discovery that dimpling is associated with the roughness of the dryer roll surface and that for efficient production of non-dimpling film, it is critical that the roughness of the roll surface be within specified limits.

The metal roll surface may be finished to the desired degree of roughness in a number of ways, and the method is not critical, so long as a finish in the acceptable range is attained. Suitable techniques include varnishing, belt sanding, grinding, shotblasting, and other techniques known in the art, with abrasives or shot sufficiently small to impart a finish in the desired range. To insure that an acceptable finished roll surface is realized, it is essential that the surface of the roll before finishing has a roughness not greater than about 80 RMS microinches.

Although it has been found that the greater part of the potential improvement in eliminating dimpling is to be gained by drying the film in contact with the specified rolls from about 125% moisture down to its windup moisture, it has also been found that maximum improvement in appearance is to be gained by using the specified rolls exclusively. It is thus preferred that all the dryer rolls be of the specified roughness. It should be remembered however, that it is more important that the film be in contact with the specified rolls during the latter stages of drying. Apparently, moisture laden regenerated cellulose film, holding greater than about 50% moisture, is sufficiently plastic to resist in some degree deformation by the rougher dryer rolls.

It is preferred that the roll surface which contacts the film be fabricated of aluminum. This is the preferred metal for the roll surface because of its combination of good heat transfer properties, lightness, and the ease with which it may be finished to the desired surface roughness. Typical examples of other materials which can be finished to a surface roughness satisfactory for use in the invention include cast iron, steel and nickel and chromium plated metals.

It is also preferred that the roll surface be coated with a varnish or lacquer finish, such as described by Herndon in U.S. Patent 2,000,079 or that it be shotblasted with fine shot, for example, No. 70 steel shot. Although any type of metal roll surface having an initial roughness as specificed above will provide a non-dimpling film, it is found that such rolls allow excessive transverse shrinkage of the film and thus, excessive loss of film area and problems associated with gauge bands which arise when the shrinkage is non-uniform. By employing a metal roll whose initial surface is of the specified roughness and which is then coated with a lacquer, or shotblasted with fine shot to the specified finish roughness, transverse shrinkage is controlled to a dagree which is not considered excessive, and gauge bands resulting from shrinkage do not develop. Even though a dryer roll is coated with a lacquer, it has nevertheless been found necessary that the metal surface of the roll have an initial finish to a roughness as specified if dimpling of the film is to be avoided. For the purpose of this invention, the detailed construction of the dryer roll is not critical and can be of any known types. It is only necessary that the surface of the roll conform to the specifications given above.

The commercial method of continuously manufacturing regenerated cellulose film from an aqueous solution of sodium cellulose xanthate (viscose) is disclosed in U.S. Patents 1,548,864 and 1,601,289 to Brandenberger. In this process, viscose is forced through an elongated orifice in the form of a sheet into a coagulating bath to form a coherent web. The film may be cast by any of several known methods, including those of Reichel et al., U.S. Patent 2,862,245, Mitchell, U.S. Patent 3,073,733, Hinkle et al., U.S. Patent 2,962,766, Levinson et al., U.S. Patent 3,050,775, and Bender, U.S. Patent 2,254,203. The freshly coagulated film is promptly regenerated, washed, desulfured, bleached, softened and dried. The dried film is wound into rolls for convenience in handling, storing and further processing, such as coating and slitting in narrow rolls. Up through the softening stage the web of regenerated cellulose remains in a gel condition (i.e. completely saturated with aqueous solution). Since gel regenerated cellulose film contains about 3.0 to 3.5 times the weight of dry cellulose as water, a substantial amount of moisture is removed in the drying operation. It is customary to dry the web by passing it through a chamber of contact with a series of heated rolls such as described by Herndon, U.S. Patent 2,000,079, Chylinski, U.S. Patent 2,141,377, Stevens, U.S. Patent 2,746,166 or Britton et al., U.S. Patent 2,746,167. The present invention is concerned with the stage of the above described process of manufacture in which the film is dried.

Although the invention is described herein in detail for regenerated cellulose films produced by the viscose process, it is applicable to use with regenerated cellulose films produced by other known methods. Such methods include, for example, cellulose regenerated from cuprammonium cellulose, from solutions of cellulose in salts such as calcium thiocyanate, and other methods known in the art.

The thickness of regenerated cellulose sheets may vary widely. The unit weight of the sheet may vary from as low as about 15 g./sq. meter to as high as about 60 g./sq. meter. Generally the unit weight will be below about 45 g./sq. meter, and the invention is especially useful in the case of thin films with unit weights below 30 g./sq. meter.

The invention is applicable both to films which contain an anchorage resin and to unanchored films. If the film contains an anchorage resin it may be impregnated into the regenerated cellulose film either before or after the film is softened, or the softener and anchorage resin may be placed in the same bath for simultaneous impregnation into the film.

When present, the anchorage resin may be any of the known types of resin employed for this purpose. One such type is the polyalkylenimines derived by the homopolymerization of one of copolymerization of two or more of the lower 1,2-alkylenimines wherein the alkylene radical contains from 2 to 8 carbon atoms. Of the materials of this type polyethylenimine and polypropylenimine are preferred because of their availability. Another type of resin includes the thermosetting resins such as urea-aldehyde, melamine-aldehyde, melamine-urea-aldehyde, guanidine-carbamide-aldehyde, and a variety of other thermosetting resins known in the art, and mixtures thereof.

Although uncoated film finds utility in some specialized uses, most often the film is subsequently coated to improve its functionality. The coating may be any of several known types. It can be, for example, a vinylidene chloride copolymer, a vinyl chloride polymer or copolymer, a polyvinyl acetate, a nitrocellulose formulation, a polyolefin such as polyethylene, or other types of coating known in the art.

The invention may be practiced regardless of what particular detailed methtod of drying the film is employed. For example, the film can be dried steadily and evenly from the gel state to its windup moisture. Alternatively, the film can be dried rapidly at first, then dried more slowly in the later stages as the windup moisture is approached. Many such detailed variations are possible. When the film is being dried from a moisture content of about 125% to its windup moisture in contact with rolls as specified hereinabove, it is thus seen that the fraction of drier rolls of the type specified can vary from well below half the total number of rolls up to as high as three-fourths or more.

In the examples, films are rated for their tendency to dimple under humid conditions. A description of the tests employed is given here.

The dimpling tendency of a two-side coated film is determined in the following away. On a rigid base, such as a piece of sheet glass or metal is placed a wet sponge; the sponge must have two flat surfaces, such as the cellulose sponges now commercially available. A sheet of the coated regenerated cellulose film to be tested is placed on the sponge in good contact with a flat surface, and held firmly in place by securing it to the edges of the base glass or metal sheet with clips. After twenty minutes the film is rated visually on the following scale:

Grade:
1 _____ No dimpling.
2 _____ Little dimpling.
3 _____ Moderate dimpling.
4 _____ Heavy dimpling.
5 _____ Severe dimpling.

A second sample of the same film is also tested, this time placing the reverse surface of the film in contact with the wet sponge. Film grades 1 and 2 are acceptable to those who package articles of commerce in cellophane, while grades 3, 4 and 5 are not acceptable.

A more rapid determination is made with one-side coated films by placing the uncoated side of a sample of such film carefully onto the surface of a pan of water. After about half a minute the film is rated on the above scale.

The following examples are illustrative of the invention, but are not intended to serve as limitations on the scope of the invention as stated herein.

*Example 1*

Gel regenerated cellulose film (containing about 300% moisture) is dried in a typical multi-roll cellophane drier from approximatey 125% moisture to 7% moisture in contact with lacquered rolls having a degree of roughness of 560 RMS microinches, the rolls before finishing having been machined in a lathe to a degree of roughness of 60 RMS microinches. During drying the transverse shrinkage of the film is such that about 5.0% of the film width is lost. The film is coated on both surfaces with a vinylidene chloride copolymer coating comprising 91.5 parts of vinylidene chloride, 6 parts of acrylonitrile, 2 parts of methyl methacrylate and 0.5 part of itaconic acid and then tested for its dimpling characteristics. The film is rated as grade 2. In this example and Example 2, surface finish measurements are made with a Brush Instruments Company "Surfindicator," Model BL–110.

As a control A the film is dried from 125% moisture to 7% moisture in contact with varnished rolls having a degree of roughness of 560 RMS microinches, the rolls before varnishing having a roughness of 200 RMS microinches, the width loss is again about 5% but the dimpling grade of the coated film is rated as grade 4.

As control B, an experiment is carried out in the same way except that the rolls before varnishing have been machined to a degree of roughness of 60 RMS microinches and after application of varnish had a degree of roughness of 850 RMS microinches. The coated film is rated as grade 5 on the dimpling test.

As control C, gel regenerated cellulose film is dried from a moisture content of about 50% down to 7% while in contact with varnished rolls having a final finished degree of roughness of 560 RMS microinches, the original rolls before varnishing having a degree of roughness of 60 RMS microinches. The resulting vinylidene copolymer coated film show a dimpling grade 3 and a width loss of 5.2%.

As control D, an experiment is carried out as control C except that the rolls before varnishing have a degree of roughness of 200 RMS microinches, the resulting coated film shows a dimpling grade of 4 and a width loss of 5.2%.

*Example 2*

Gel regenerated cellulose film containing about 300% moisture is dried to a moisture content of 10% in contact with aluminum rolls which first have been machined to a degree of roughness of 60 RMS microinches and then sandblasted with No. 70 steel shot obtained from the Pangborn Corp., 840 South Oak Park, Oak Park, Ill. The shotblasting equipment on which the finishing is done is from Vacu-Blast Co., Inc., 350 Peninsular Avenue, San Mateo, California. The degree of roughness of the final finished rolls is 450 RMS microinches. The resulting dried film is coated on one side of a nitrocellulose coating and is then submitted to the dimpling test wherein it is given a rating of grade 1. Width loss of the sheet during drying is 5.0%.

As control A, the degree of roughness of the rolls before being sandblasted is 200 RMS microinches, the resulting coated film shows a dimpling grade 4.

As control B, the rolls before sandblasting have a degree of roughness of 60 RMS microinches and are shotblast with No. 6–60 steel shot to a final degree of roughness of 950 RMS microinches, the resulting coated film shows a dimpling grade 5.

As control C, the film is dried from about 50% moisture to 8% moisture on aluminum rolls which have an original degree of roughness of 60 RMS microinches and are shotblast with No. 70 steel shot to a final degree of roughness of 400 RMS microinches. The resulting dried film is coated on both surfaces with a nitrocellulose coating and on submitting to the dimple test is given a grade 3. Width loss during drying is 5.0%.

As control D, an experiment is carried out as in control C except the degree of roughness of the aluminum rolls before sandblasting is 200 RMS microinches, a dimpling grade 4 is obtained on the resulting coated film. Width loss is again 5.0%.

As control E, gel regenerated cellulose film containing about 300% moisture is dried to a moisture content of 10% on drier rolls which have a degree of smoothness of 80 RMS microinches and which are not further varnished or shotblasted. The resulting dried film is coated on both surfaces with a vinylidene chloride copolymer coating and is found to have a dimpling grade 1 but a width loss during drying of 14.0%.

As control F, an experiment is carried out as described in control E but wherein all of the drier rolls are varnished and have a degree of roughness of 250 RMS microinches, dimpling is rated grade 1 and the width loss during drying is 10%, still excessively high for efficient production.

The primary advantage of this invention is that films made in accordance with the process described have a superior non-dimpled appearance while being free from excessive width loss. Further, the films have little or no tendency to dimple at a later time when the packages on which the film is used are subjected to conditions of high relative humidity.

What is claimed is:

1. In the drying of a continuous web of non-fibrous gel cellulosic film in a multi-roll drier, the process comprising:

passing a continuous web of non-fibrous gel cellulosic film over and in contact with a series of heated dryer rolls having a finished surface roughness between 300 and 650 RMS microinches, said rolls having a surface roughness before finishing below about 80 RMS microinches and applying heat to said film to effect the drying of said film from about 125% moisture to about 5 to 10% moisture by weight, based on the weight of dry cellulose.

2. The process of claim 1 wherein the cellulosic film is regenerated cellulose film.

3. In the drying of a continuous web of non-fibrous gel cellulosic film in a multi-roll drier, the process comprising:

passing a continuous web of non-fibrous gel cellulosic film over and in contact with a series of heated dryer rolls having a finished surface roughness between 300 and 650 RMS microinches, said rolls having a surface roughness before finishing below about 80 RMS microinches and applying heat to said film to effect the drying of said film to about 5 to 10% moisture by weight, based on the weight of dry cellulose.

4. The process of claim 3 wherein the surface of the dryer rolls is of aluminum.

5. The process of claim 3 wherein the cellulosic film is regenerated cellulose film.

References Cited

UNITED STATES PATENTS

| | | | |
|---|---|---|---|
| 2,151,049 | 3/1939 | Laing | 34—41 |
| 2,746,166 | 5/1956 | Stevens | 34—41 |
| 3,246,400 | 4/1966 | Brown | 34—110 |

KENNETH W. SPRAGUE, *Primary Examiner.*